United States Patent [19]

Epple et al.

[11] Patent Number: 5,533,779
[45] Date of Patent: Jul. 9, 1996

[54] VEHICLE BODY

[75] Inventors: Anton Epple, Rottenburg; Martin Pfeiffer, Stuttgart; Martin Kruse, Bondorf; Wolfgang Volz, Magstadt, all of Germany

[73] Assignee: Mercedes-Benz AG, Germany

[21] Appl. No.: 340,309

[22] Filed: Nov. 14, 1994

[30] Foreign Application Priority Data

Nov. 12, 1993 [DE] Germany ............ 43 38 685.7

[51] Int. Cl.⁶ ..................................... B60J 1/20
[52] U.S. Cl. .............. 296/192; 296/208; 15/250.01; 454/146
[58] Field of Search ................ 296/192, 208; 15/250.01; 454/146, 147, 148, 149

[56] References Cited

U.S. PATENT DOCUMENTS

| | | | |
|---|---|---|---|
| 3,213,493 | 10/1965 | Chichester | 15/250.01 |
| 3,300,143 | 1/1967 | Lawson | 15/250.01 |
| 3,447,185 | 6/1969 | Zichichi et al. | 15/250.01 |
| 3,461,475 | 8/1969 | Mathison | 15/250.01 |
| 3,632,042 | 1/1972 | Goulish et al. | 15/250.01 |
| 4,722,265 | 2/1988 | Koukal et al. | 454/147 |
| 4,779,517 | 10/1988 | Weller et al. | 454/146 |
| 4,874,198 | 10/1989 | Roller | 296/192 |

FOREIGN PATENT DOCUMENTS

| | | | |
|---|---|---|---|
| 331644A | 9/1989 | European Pat. Off. | 454/146 |
| 2242107 | 6/1979 | Germany . | |
| 3736780C1 | 12/1988 | Germany . | |
| 42356 | 2/1991 | Japan | 15/250.01 |
| 1736808A | 5/1992 | U.S.S.R. | 296/192 |
| 1441406 | 6/1976 | United Kingdom | 296/192 |
| 2239432A | 7/1991 | United Kingdom . | |
| PCT/EP91/00344 | 9/1991 | WIPO . | |

Primary Examiner—Gary C. Hoge
Attorney, Agent, or Firm—Evenson, McKeown, Edwards & Lenahan

[57] ABSTRACT

A vehicle body, in particular for passenger cars, with an opening, which extends over the entire width of the body between the windshield and the rear edge of the engine hood and is divided into a water-inlet region with a water channel arranged underneath it for the water running off the windshield, and into an air-inlet region for an air-supply device for the passenger cell. To prevent alcohol fumes from the washing water sprayed onto the windshield from being drawn in via the air-inlet region, the latter is formed by the inlet of an air-water channel, which is closed on all sides, has a connection for the air-supply device and is secured in the engine compartment at such a distance from the windshield that it bounds a wiper recess, which lies toward the windshield and the recess opening of which constitutes the water-inlet region and the recess bottom of which forms the water channel. Washer jets are arranged on the upper edge of the channel wall, bounding the wiper recess, of the air-water channel.

10 Claims, 1 Drawing Sheet

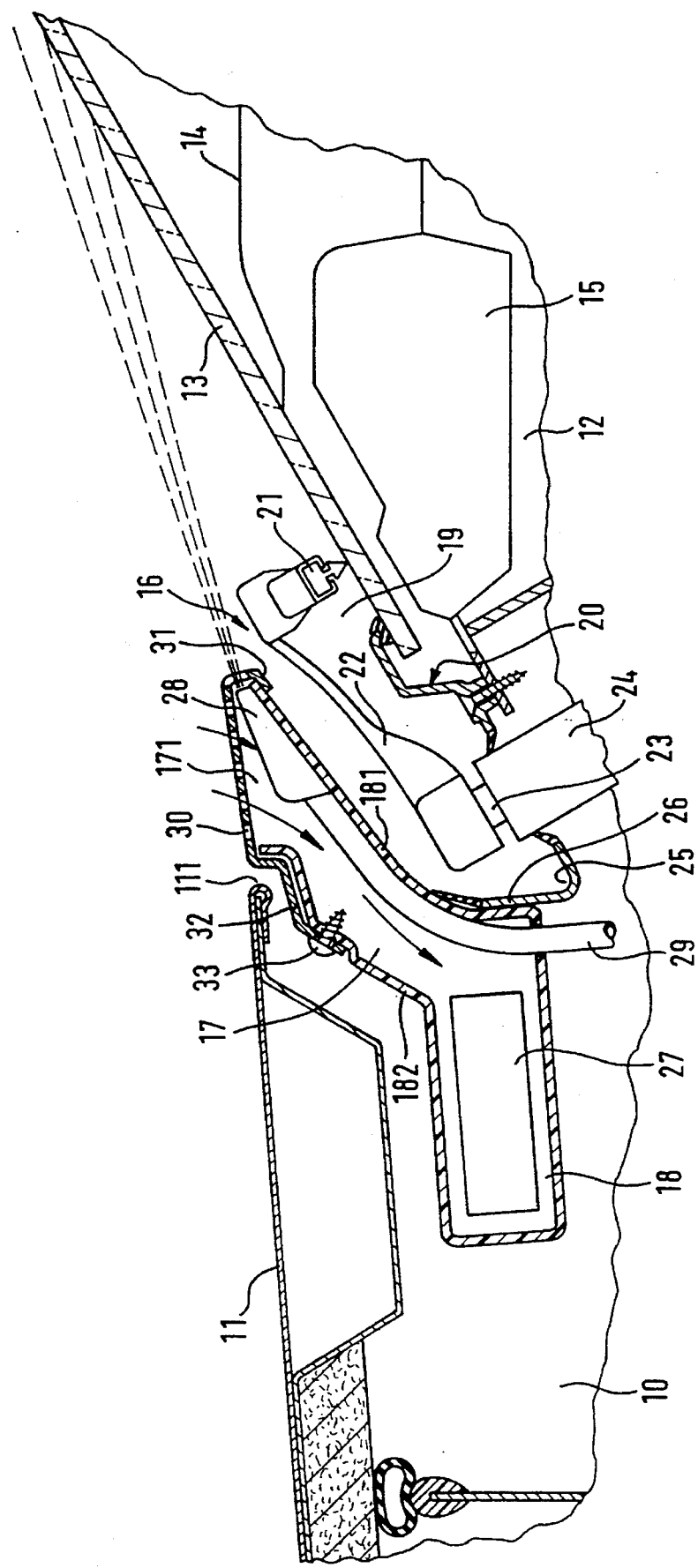

VEHICLE BODY

BACKGROUND OF THE INVENTION

The present invention relates to a vehicle body and, more particularly, to a passenger car body, a front-end engine compartment which can be covered by an engine hood, a passenger cell adjoining the engine compartment and closed off towards an engine hood by a windshield, and an opening extending over the entire width of the vehicle body from a rear edge of the hood facing the windshield up to the windshield. The opening is divided into a water-inlet region, lying direction the windshield, with a water channel arranged thereunderneath for water running off the windshield, and an air-inlet region, lying directly on a rear edge of the engine hood, for an air-supply device for the passenger cell.

In the vehicle body shown in DE 37 36 780 C1, the lower edge of the windshield or front window extends in the transverse direction of the body. A cover strip, which is secured to the windshield by clips arranged at intervals and maintains a distance from the windshield, runs along the lower edge of the windshield. This cover strip separates the two inlet regions for air and water from each other. Outside air is drawn in by a blower of the air-supply device via the air-inlet region, through an air filter located under the engine hood. The separation of the water-inlet and air-inlet region brought about by the cover strip has the effect that water running off over the windshield is no longer whirled up and mixed with the drawn-in outside air. High air humidity has a considerable adverse effect on the service life of activated carbon filters which in many cases are arranged after the air filter in the air-supply device. The air-inlet region is connected directly above the water channel to the water channel so that dripping water, which also penetrates into the air-inlet region via the opening, can flow away via the water channel.

Vehicles are nowadays usually equipped with a window-washing system which, when the driver chooses, sprays washing water onto the windshield by washer jets which are arranged in front of the windshield. To improve the cleaning power and for frost protection a washer concentrate is added to the washing water. If, in the case of the known vehicle body, the washer jets are positioned in the necessary position on the engine hood, alcohol fumes, which emerge from the washer concentrate sprayed onto the windshield, cannot be prevented from entering together with the outside air into the air-supply device and passing into the activated carbon filter, thereby substantially adversely affecting the functionality of the filter.

Such mixing of the alcohol fumes from the window-washing water with the intake air for the air-supply device can, for example, be avoided with a construction described in DE 22 42 107 C2. There, the air-inlet region for the air-supply device is arranged in the rear region of the engine hood, and between the air-inlet region and windshield there is also provided a cowl channel so that the washer jets can be arranged in a front of the cowl channel and behind the air-inlet region. An air-guiding plate, which runs below the engine hood and is secured thereon, forms, together with the engine hood, a first portion of a fresh-air duct, which adjoins the air-inlet region and is connected to a second portion of the fresh-air duct, which portion is constructed below the windshield, by sealing profiles. The engine hood is initially displaced as a whole horizontally in the travel direction, as it is being opened, before being pivoted about its front edge. As a result, the seals, which are secured on the first portion of the fresh-air duct, are raised from the second portion of the fresh-air duct and are pressed on again during the corresponding closing movement. This construction is very complex from the manufacturing point of view and, because of the seals required between the two portions of the fresh-air duct on the movable engine hood and on the fixed body part, also requires a complicated pivoting mechanism for the engine hood.

An object of the present invention is to solve, in a vehicle body, the problem of preventing alcohol fumes from the window-washing water from being drawn in through the air-supply device, in a constructionally simple manner, and to provide a configuration which is cost-effective also from the manufacturing point of view.

The foregoing object has been achieved in accordance with the present invention in a vehicle body in which the air-inlet region is comprised of the inlet of a closed air-water channel having a connection for an air-supply apparatus, and by a water outlet, whereby the air-water channel is secured in the engine compartment at a distance from the windshield such that, on the side lying opposite the windshield, the air-water channel bounds a wiper recess accommodating wiper arms with wiper blades in a storage position thereof. An opening of the recess constitutes the water-inlet region and the bottom of which forms the water channel, and washer jets are arranged on a channel wall, which bounds the wiper recess of the air-water channel at least near to the upper boundary edge of the inlet of the air-water channel.

The air-water channel according to the present invention is fixed on the engine-compartment side and renders unnecessary any seal between the air-intake or air-inlet region, on one hand, and the engine hood on the other hand. Thus, the engine hood can be provided with a simple pivoting mechanism and does not send any horizontal displacement. The inlet region for the outside air lies, in the travel direction of the vehicle, in front of the wiper recess, which surrounds the water-inlet region, and in front of the washer jets, which are arranged directly on the opening edge of the wiper recess. The inlet region for the outside air thus lies a long way from the windshield and also in front of the washer jets so that alcohol fumes, emerging from the washing water flowing off over the windshield, do not reach the region of the intake air and hence do not enter into the air-supply device.

The air-water channel can advantageously be produced in one piece and preferably as a blow-molded plastic part, and is thus a simple and cost-effective component from the manufacturing point of view. As a constructional unit, which is closed on all sides and has an inlet for the outside air and a connection for the air-supply device, as well as a water outlet, the air-water channel can be accommodated in a problem-free manner in the engine compartment without a risk of polluted air or gases from the engine compartment entering into the air-supply device. The washer jets, which are integrated into the inlet of the air-water channel, can easily be installed and maintained. The hoses to the washer jets can be installed in the engine compartment, to reduce their length and the risk of them freezing up.

BRIEF DESCRIPTION OF THE DRAWING

These and other objects, features and advantages of the present invention will become more readily apparent from the following detailed description thereof when taken in conjunction with the accompanying sole figure which shows part of the longitudinal cross-section through a vehicle body for a passenger car, in the region of the windshield and the rear part of the engine compartment and engine bond.

DETAILED DESCRIPTION OF THE DRAWING

The passenger car body, only part of which is shown in longitudinal section has, in a well known manner, a front-end engine compartment 10, which can be covered by an engine hood 11, and an adjoining passenger cell 12 closed off towards the engine hood 11 by a front window or windshield 13. In the passenger cell or compartment 12, the dashboard or the instrument panel is indicated by 14, and an air duct 15 of an air-supply device provides air-conditioning for the passenger cell 12 in conjunction with an air-conditioning system.

An opening 16 is provided between the windshield 13 and the rear edge 111 of the engine hood 11 facing the windshield 13. The opening 16 extends over the entire width of the vehicle body. An inlet connecting stub 17 of an air-water channel 18 protrudes into the opening 16. The inlet 171 of the inlet connecting stud 17 lays approximately in the plane of the engine hood 11. The air-water channel 18 is arranged under the engine hood 11 and extends, just as its inlet connecting stud 17 does, over the entire width of the body. One edge of the inlet 171 is adjacent on the rear edge 111 of the engine hood 11.

The air-water channel 18 is manufactured in one piece from plastic, for example as a blow-molded part, and is secured in the engine compartment 10 at such a distance from the windshield 13 that it bounds a front-mounted wiper recess 19 towards the windshield 13. The channel wall 181 of the air-water channel 18 faces the windshield 13 and together with the inlet connecting stub 17 form one recess boundary, and the windshield 13, together with a body part 20, which extends from its lower edge in elongation thereof, forms the other, lower boundary of the wiper recess 19.

The wiper recess 19 serves for accommodating wiper blades 21 and the wiper arms 22 in their storage position. A driving spindle 23 is passed through a bearing 24 held in the body part 20. Adjacent to the bearing 24, the body part 20 is shaped as a water channel 25 which forms the recess bottom of the wiper recess 19 and catches the water running off over the windshield and conducts it away into the open air. A securing web 26 directly adjoins the water channel 25 in an angled manner on the body part 20, and runs approximately vertically upwards. The air-water channel 18 is secured on the securing web 26.

The air-water channel 18 has a connection opening 27 for the air-supply device through which a conventional blower, which is integrated into the air-supply device in a known way, draws in outside air which penetrates to the air-water channel 18 via the inlet 171 of the inlet connecting stub 17. In order to conduct away rainwater which likewise enters via the inlet 171, at the lowest point of the air-water channel 18 there is a water outlet (not visible). In the inlet connecting stub 17 of the air-water channel 18, on the channel wall 181 there are arranged washer jets 28 so that their spray openings lie directly on the opening edge of the inlet 171 and are directed towards the windshield 13. The washer jets 28 are connected via hoses 29, which are passed through the engine compartment 10, to one or more washing-water reservoirs (not shown) with a conventional washing pump (not shown) which is likewise arranged in the engine compartment 10.

The inlet 171 of the inlet connecting stud 17 is completely covered by an air-inlet grill 30 which is recessed only at the points for the washer jets 28. The air-inlet grill 30 is placed onto the inlet connecting stud 17 and is secured thereon. To this end, it engages with a lug 31 over the upper edge of the channel wall 181 and rests with a tongue 32 on the channel wall 182 of the inlet connecting stub 17 and lies opposite the channel wall 181. The tongue 32 is anchored in the channel wall 182 by self-tapping sheet-metal screws 33. The screw connection of the tongue 32 to the channel wall 182 is positioned such that it is covered by the engine hood 11 when the latter is closed. That region of the air-inlet grill 30 which covers the inlet 171 of the inlet connecting stub 17 lies in the plane of the engine hood 11 and terminates flush with the upper side thereof.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A vehicle body having an engine hood, a front-end engine compartment arranged to be covered by the engine hood, a passenger cell adjoining the engine compartment and closed off towards the engine hood by a windshield, and an opening extending over the entire width of the vehicle body from a rear edge of the engine hood facing the windshield up to the windshield, which opening is divided into a water-inlet region with a water channel arranged thereunderneath for water running off the windshield, and an air-inlet region for an air-supply device for the passenger cell, wherein the air-inlet region is comprised of an air-water channel having an air inlet and a connection for an air-supply apparatus, the air-water channel is secured in the engine compartment at a distance from the windshield such that, on a side opposite the windshield, a first air-water channel wall bounds a wiper recess accommodating wiper arms with wiper blades in a storage position thereof, an opening of which constitutes the water-inlet region and the bottom of which forms the water channel, and washer jets are arranged on the first air-water channel wall at least near to an upper and thereof between the windshield and the air inlet of the air-water channel.

2. The vehicle body according to claim 1, wherein the air-water channel is arranged below the engine hood and, with an angled inlet connecting stub, reaches up to the rear edge of the engine hood.

3. The vehicle body according to claim 1, wherein the air-water channel is a one piece plastic part.

4. The vehicle body according to claim 1, wherein the air-water channel is secured on a web fixed on the engine compartment, the web comprising a body part extending forwardly of the windshield.

5. The vehicle body according to claim 4, wherein the body part extends from the lower edge of the windshield, and forms the water channel.

6. The vehicle body according to claim 2, wherein an air-inlet grill covers the air inlet of the air-water channel and is securably arranged on the inlet connecting stub.

7. The vehicle body according to claim 6, wherein the air-inlet grill engages with a lug over the upper edge of the first air-water channel wall and is screwedly connected with a tongue on a second air-water channel wall opposite the first air-water channel wall.

8. The vehicle body according to claim 7, wherein the screw-connection is positioned so as to be covered by the closed engine hood.

9. The vehicle body according to claim 6, wherein the air-inlet grill lies in a plane with the engine hood and terminates flush with the upper side thereof.

10. The vehicle body according to claim 1, wherein hoses adapted to be connected to the washer jets and lead to a washing-water reservoir are passing through the engine compartment.

* * * * *